United States Patent [19]
Jabs

[11] Patent Number: 5,094,071
[45] Date of Patent: Mar. 10, 1992

[54] TURBORAMJET ENGINE

[75] Inventor: Alfred Jabs, Groebenzell, Fed. Rep. of Germany

[73] Assignee: MTU Motoren und Turbinen Union Muenchen GmbH, Fed. Rep. of Germany

[21] Appl. No.: 597,035

[22] Filed: Oct. 15, 1990

[30] Foreign Application Priority Data

Oct. 13, 1989 [DE] Fed. Rep. of Germany ....... 3934268

[51] Int. Cl.⁵ .............................................. F02K 7/16
[52] U.S. Cl. ..................................... 60/244; 137/15.1; 244/53 B
[58] Field of Search ................. 60/224, 225, 244, 245, 60/270.1; 137/15.1, 15.2; 244/53 B

[56]  References Cited
U.S. PATENT DOCUMENTS 3,161,018 12/1964 Sandre .................................. 60/244
3,161,379 12/1964 Lane ..................................... 60/244
3,432,100 3/1969 Hardy et al. ........................ 60/244

FOREIGN PATENT DOCUMENTS 392527 10/1990 European Pat. Off. .............. 60/244
2216855 10/1989 Fed. Rep. of Germany .... 244/53 B Primary Examiner—Louis J. Casaregola
Attorney, Agent, or Firm—Evenson, Wands, Edwards, Lenahan & McKeown

[57]  ABSTRACT

A turboramjet engine is provided having a ram air duct which is constructed between an outer duct wall and a housing-type shrouding of a basic turbo-engine, and having shut-off devices by means of which the ram air duct, when the basic engine is switched on and the ramjet engine is switched off, is to be shut-off on the air supply side, with the simultaneous release of intake air into the basic engine. In this case, among other things, the shrouding is to form an air shaft which is widened in a polygonal manner in the direction of the inlet-side end of the ram air duct and is to have breakthroughs there, the shut-off devices being flaps which are pivotally arranged at the breakthroughs and which, when the ramjet engine is switched on, expose the breakthroughs and in the process form a shut-off body of the air shaft which is symmetrically acutely folded together with respect to the ram air flow.

20 Claims, 3 Drawing Sheets

TURBORAMJET ENGINE

BACKGROUND AND SUMMARY OF THE INVENTION

The invention relates to a turboramjet engine having a ram air duct constructed between an outer duct wall and a housing-type shrouding of a basic turbo-engine, and having shut-off devices by means of which the ram air duct is shut off when the basic engine is switched on and the ramjet engine is switched off, while at the same time releasing intake air into the basic engine on the air supply side.

Recently, combined turboramjet engines have regained importance, specifically within the scope of so-called "hypersonic flight concepts" with an extremely high spectrum of application from takeoff to high supersonic speed at high flight altitudes (up to an altitude of approximately 30 km). In this case, the hypersonic flight concepts, among other things, include a space flight aggregate concept (Sänger Project) which, as described in the following, amounts to a two-stage concept. The first stage is to be carried out by a flight aggregate operating only within the atmosphere, while the second stage is based on a useful-load flight aggregate which is taken along "piggyback" by the mentioned flight aggregate. For the purpose of space missions, in the upper range of the atmosphere the useful-load flight aggregate is to independently continue on the flight path assigned to it by means of a suitable rocket propulsion system. The flight aggregate responsible for the first stage can therefore return and be re-used and carries out starts and landings like a conventional airplane.

In the case of combined turboramjet engines which are to be used for example for a flight aggregate of this type generally, when a flying speed of approximately Mach 3 is reached, the turbojet engine is to be switched off continuously, and the respective ramjet propulsion is to be switched on continuously so that, by means of the latter alone, desired high supersonic or hypersonic speeds are reached of up to Mach 4.5 or even more. Flying speeds of approximately Mach 2 or even more may be achieved in this case in the combined operation of "jet engine with a switched-on afterburner". The afterburner, which for this purpose is advantageously connected behind the jet engine part and is acted upon possibly by a combination of compressor or fan air and engine exhaust gas, by means of the connection of additional fuel injection devices together with flame stabilizers, may form the propulsion system for the ramjet operation, with a correspondingly proportioned exclusive ambient-air supply when the turbojet engine part is switched off. With a correspondingly adapted inlet and propelling-nozzle geometry, in the case of the concerned engine, the basic turbo-engine must therefore be switched off or shut down in the hypersonic operation, the required ram air then acting upon the exterior ram-air duct. This ram air may, for example, be supplied to the supplementary combustion chamber for the ramjet operation downstream of the basic turbo-engine end.

In this case the required shut-off device or devices of the basic engine part are extremely important. In the shut-off or blocked position of the basic engine during the ramjet operation, the basic engine must be impaired as little as possible by the comparatively high temperatures (approximately 1,700° C.) of the ram air. This also applies to the shut-off devices themselves which must be constructed to be correspondingly robust and operationally reliable but which must nevertheless ensure at the same time that, for example, in the subsonic operation, an optimal aerodynamically perfect intake air supply is possible from the engine inlet to the basic turbo-engine in correspondingly proportioned quantities.

For the shutting-off or exposing, as the case may be, of the basic turbo-engine on the air supply side, the use of axially adjustable drop-shaped central bodies in the direction of the axis of the engine has been provided, for example, in combination with axially adjustable annular slide plates. The latter has the purpose of exposing or shutting off, as the case may be, the supply of ram air into the ram air duct in coordination with the adjustment by the central body. This type of a concept requires a comparatively large constructional widening of the circumference of the whole engine system in order to ensure the air inflow surfaces and paths into the ram air duct, that are required from case to case, but particularly to the compressor of the basic engine—in this case, therefore downstream of the largest diameter of the central body, among other things, in view of the required flow rates and flow Mach numbers. The mentioned constructional widening of the constructional circumference has the disadvantage of an increased aerodynamic frontal-area resistance and component weight. The reason for the latter is, among other things, also the construction of the central body itself. This type of a central body—whether it is arranged in an axially slidable or stationary manner—is an always present interference body resulting in aerodynamic losses, particularly as far as the release position of the intake air supply into the compressor of the basic turbo-engine is concerned.

It is an object of the invention to provide an engine of the initially mentioned type which, particularly in view of the construction and arrangement of the shut-off devices, while the constructional widening of the engine (diameter) is comparatively slight, permits an aerodynamically optimal charging of air to the ram air duct while the basic engine is shut off, or of the basic engine (compressor) while the ram-air duct is shut off.

According to the invention, the mentioned object is achieved according to preferred embodiments of the invention by providing an arrangement wherein an upstream axial extension of the ram air duct ends in front of a compressor-side front end of a basic turbo-engine on the inlet side, wherein the shrouding forms an air shaft which in the direction of the inlet-side end of the ram air duct is widened in a polygonal manner, wherein the shrouding has breakthroughs on the inlet-side end of the ram air duct, and wherein the shut-off devices are flaps which are pivotally arranged at the breakthroughs and which, when the ramjet engine is switched on, expose the break-throughs and in the process form a shut-off body of the air shaft which is folded together symmetrically acutely with respect to the ram air flow.

It is an advantage that is very important to the invention that the flaps are at the same time shut-off devices of the basic engine and of the ram-air duct. In this case, when only the basic turbo-engine is operative and the flaps are moved into the breakthroughs, a free flow cross-section for the intake air in the intake channel is developed which, in the axial direction, is not impaired by any mounted parts. By means of even only two square or rectangular flaps which acutely or in a roof shape are folded together as an extended plane of symmetry of the engine, the basic engine can be shut-off during the ramjet operation and, in the process, the ram air flow can be uniformly distributed in the direction of the thus exposed breakthroughs. In one contemplated embodiment of the invention, two breakthroughs are provided which are laterally opposite one another and are connected by wa of the locally assigned inlet-side end of the ram air duct with its contour extending along the overall circumference. In addition, the two flaps, with their exterior edges, would also have to be arranged to be sealingly movable along linear wall surfaces of the four-cornered shrouding.

The additional use of triangular flaps which is possible according to certain preferred embodiments of the invention permits breakthroughs that are essentially uniformly assigned on all sides, are arranged along the circumference in the shrouding, and are connected with the inlet-side end of the ram air duct.

In preferred embodiments of the invention, the ram air duct is therefore constructed to be ring-shaped with the part of the shrouding forming the air shaft changing to a four-cornered or polygonal cross-section not before reaching a transition area to the inlet-side end of the ram air duct. The latter is also true in connection with the geometrically correspondingly adapted residual wall ends of the outer circumferential wall for the ram air duct. In other words, in connection with the arrangement of the shut-off devices and breakthroughs, only a corner-side widening of the engine is obtained from the at first purely circular outer structure of the engine (basic turbo-engine) in the direction of the upstream end of the ram air duct. Thus, according to the invention, the breakthroughs and flaps are preferably arranged or assigned to one another on segments of the polygonal or four-cornered section of the shrouding which has a straight surface in the axial and circumferential direction.

Other objects, advantages and novel features of the present invention will become apparent from the following detailed description of the invention when considered in conjunction with the accompanying drawings.

DETAILED DESCRIPTION OF THE DRAWINGS

Figure 1:
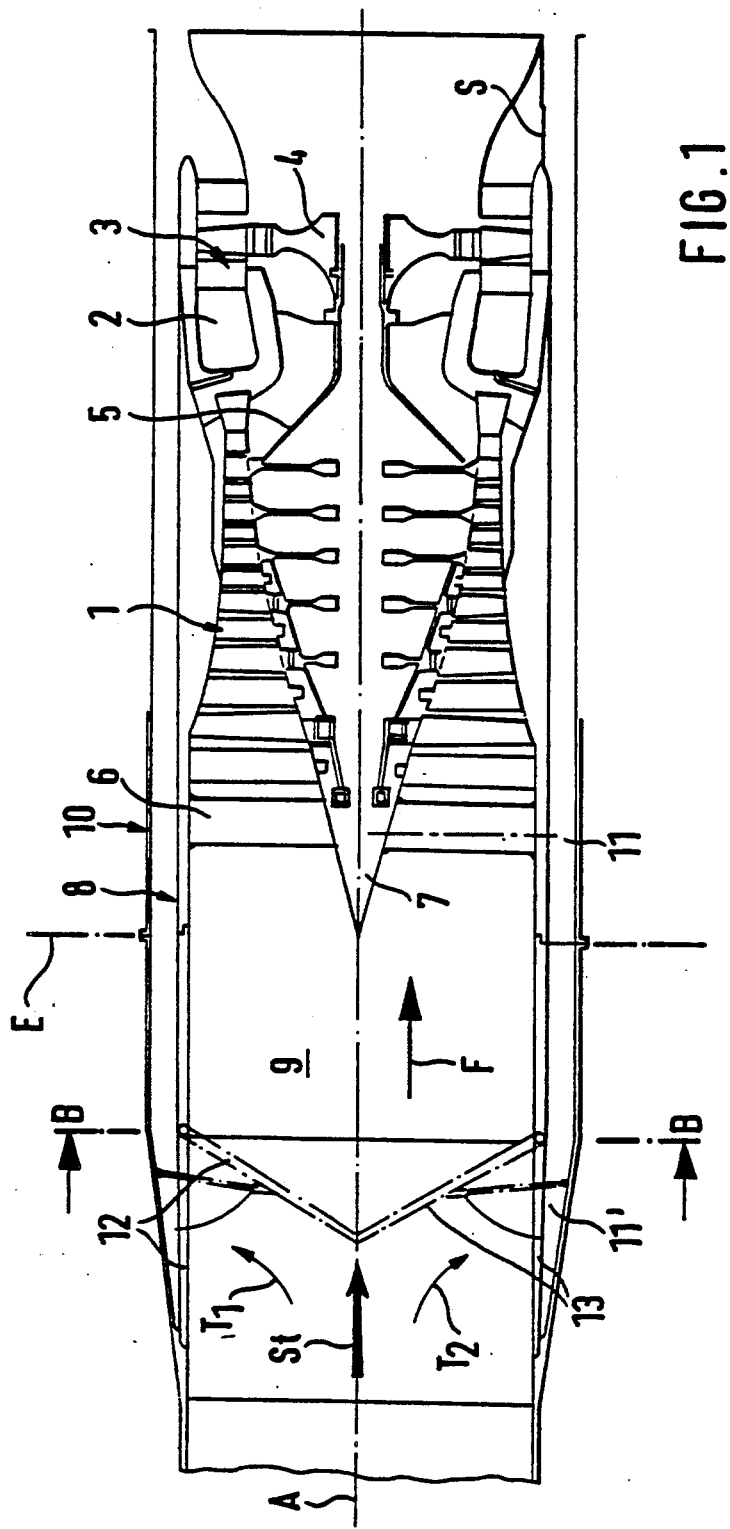
FIG. 1 is a schematic center longitudinal sectional view of the turboramjet engine having a double-housing structure which widens in assignment to an air shaft as an upstream axial extension, and of a shut-off system integrated in it, having flaps in two different end positions, constructed according to a preferred embodiment of the invention.

The turboramjet engine illustrated schematically in FIG. 1, on the one hand, comprises a basic turbo-engine which is arranged in an axially central manner and—viewed from the left to the right—comprises a multistage axial-flow compressor 1, an annular combustion chamber 2, and a single-stage driving turbine 3 of the axial-flow compressor 1 which is connected behind the annular combustion chamber 2. To this extent, this is a "normal" single-circuit "gas generator". In this case, the wheel disk 4 of the driving turbine 3, on the side of the shaft is coupled in a rotatably fixed manner, with the drum-type rotor 5 of the axial-flow compressor 1. Supporting blades 6 ar connected in front of the inlet plane into the axial flow-compressor 1 and are arranged between a stationary inlet cone 7 and the housing-type shrouding 8 of the basic turbo-engine. As an upstream extension, the shrouding 8 develops into an air shaft 9 which frontally is connected with a not shown variable air inlet for the overall engine. According to the invention, it is provided that a ram air duct 11 which is enclosed between an exterior duct wall 10 and the housing-type shrouding 8 of the basic turbo-engine, with its inlet-side end 11', is disposed in front of the front end of the basic turbo-engine. A jet pipe wing, which is not shown in the drawing, is connected to the downstream end of the basic turbo-engine and of the ram air duct 11 in which, for example, a combined combustion device for the supersonic flight operation (afterburner) or the hypersonic flight and ramjet operation (supplementary burner) may be arranged, as well as having a controllable propelling nozzle arranged at the end of the jet wing with a nozzle geometry which is variably adaptable to different flying missions, ranging from the case of a ground take-off to the operation at extremely high flying altitudes (hypersonic flight operation). During the ramjet operation, the basic turbo-engine, which is shut down in this case, also on the discharge side of the hot gas, downstream of the turbine 3, would also have to be shut off with respect to the ram air flow contained in the ram air duct 11 (slide configuration S).

Also, according to the invention, at least the shrouding 8 must have a cross-section (see also FIG. 2) which, in the direction of the inlet-side end 11' of the ram air duct 11, is polygonal, in the present example, four-cornered or square, under the air shaft 9 which has correspondingly widened contours. According to the invention, the shut-off devices for the air-side shutting-off of the basic turbo-engine or of the ramjet propulsion, as the case may be, also consist of, in the present example four triangular flaps each having the same area of which (FIG. 1 with FIG. 2) an upper and a lower flap have the reference numbers 12 and 13 respectively, and two additional laterally outer flaps (FIG. 2) have the references number 14 and 15. Breakthroughs 16, 17, 18, 19 which are dimensioned to be adapted to the triangular flaps each having the same surface are easily visible in FIG. 2. These flaps are pivotable around axes of rotation, such as 20 and 21 (flaps 12, 13—FIG. 3), arranged transversely with respect to the axis A of the engine, with their one surface ends being pivotable at the breakthroughs, such as 16, 17, specifically in such a manner that, in the shut-off position in which they move, for example, into the breakthroughs 14, 15 according to FIG. 1—shown by drawn-out lines—, they shut off the ram air duct 11 at the inlet-side end 11'. In this manner, during the exclusive basic turbo-engine operation, a completely interference-free overall flow of intake air through the air duct 9 (arrow F) is achieved in the direction of the inlet of the axial-flow compressor 1. In addition, the four flaps 12, 13, 14, 15 (FIG. 1 and 2) are pivotable such at the one ends of the breakthroughs 16, 17, 18, 19 that, in the further end position, indicated by a dash-dotted line, while simultaneously exposing the breakthroughs 16 to 19 (FIG. 2), they form a pyramidal shut-off body of the air shaft 9 which is folded together in an acute manner with respect to the ram air flow St (FIG. 1). Thus, the "point" of the shut-off body which is formed by all four outer flap ends is disposed on the engine axis A and is directed against the ram air flow St. The pyramidal shut-off body formed by all four flaps, in this case, at the same time, represents a flow divider for the ram air St in that this ram air is divided into equal parts (for example, arrows $T_1, T_2$—FIG. 1) in the direction of the breakthroughs, for example, 17, 16—FIG. 2.

Figure 3:
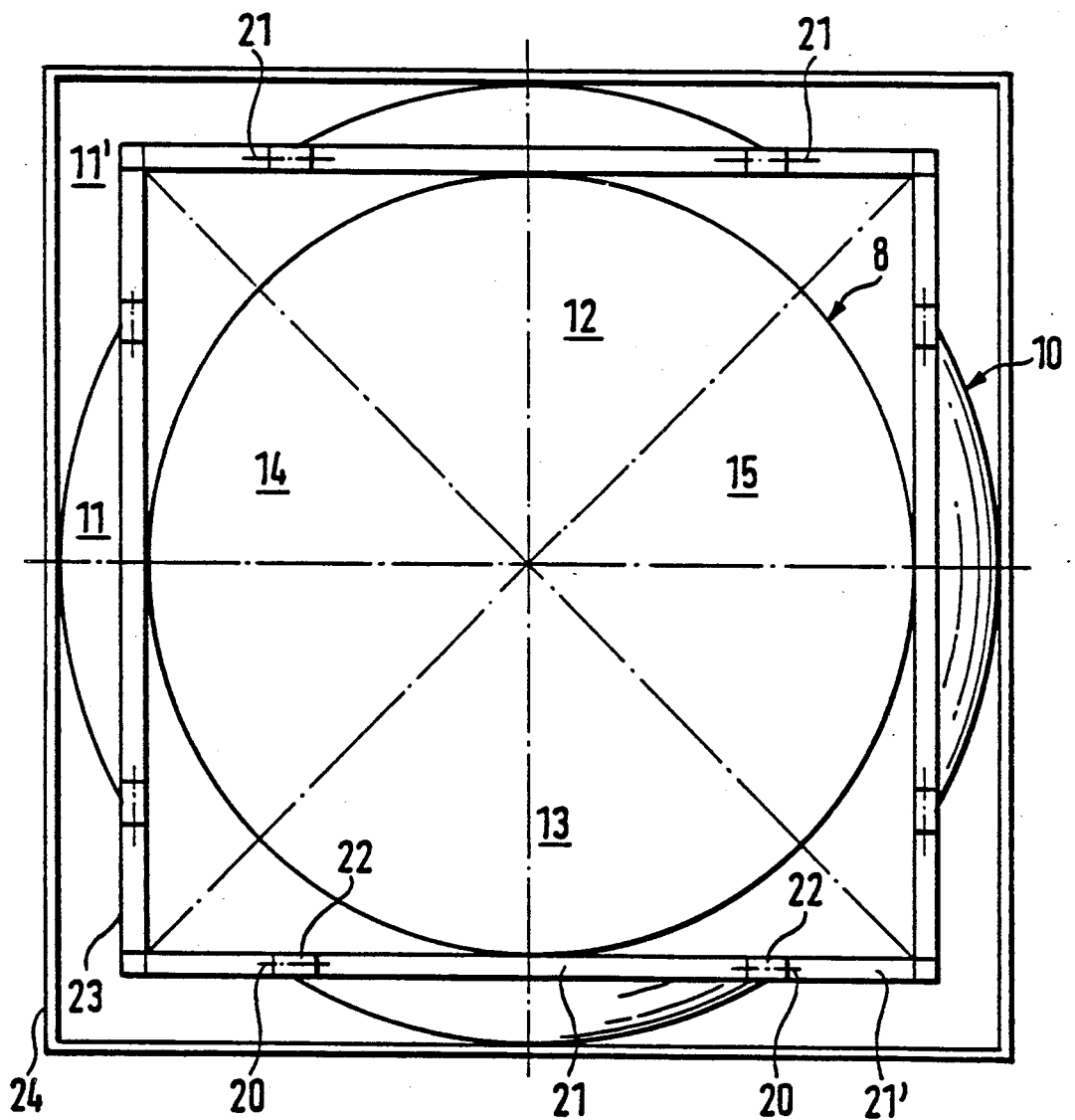
FIG. 3 is a sectional view taken along section B—B of FIG 1.

According to the contours, shown by a dash-dotted line in FIG. 3, from the oblique surface ends of the triangular flaps 12, 13, 14, 15 which contact one another, the latter are tightly pressed against one another by the high pressure of the ram air while forming this pyramidal shut-off body. In this case, the laterally adjacent surface end edges of the flaps may be ground oblique in such a manner that, in the folded-together position ("pyramid") they come to rest on one another in a close and tight manner. In this context, a counter-surface-side overlapping structure is also conceivable between adjacent surface end edges.

As also illustrated schematically in FIG. 3, the flaps 12 to 15 may be pivoted in a hinge-type manner at straight downstream end surfaces of the breakthroughs. In an assignment, for example, to flap 13, the corresponding end surface 21' therefore has axially projecting nose-type projections 22 which may engage in assigned recesses of corresponding countersurface ends of the flaps while using a pivot-type swivel bearing.

The invention also contemplates embodiments providing one, three or a plurality of identical triangular flaps, in an assignment to breakthroughs in the shrouding which are adapted with respect to the surface—in which case the shrouding would have to be widened in a polygonal manner—in order to then also form a pyramidal shut-off body of the air intake shaft which is folded together in an acute manner with respect to the ram air flow. A pyramidal shut-off body of this type would also be conceivable in the case of a configuration which provides a rectangular cross-sectional widening of the shrouding and thus of the air intake shaft, in which case the shut-off devices are then four triangular flaps of the same constructional length, of which the first mutually opposite flaps always have the same surface but larger areal contents than second mutually opposite flaps with the same respective surface.

The invention can definitely also be carried out with only two pivotable flaps. Thus, if it is imagined that, for example, in the case of FIG. 1, two flaps 12, 13 are involved which have a rectangular cross-section and which, when corresponding, in this case, now rectangular cross-sections in the shrouding 8 are exposed, form a shut-off body which may also be called "roof-shaped". This roof-shape takes place in that therefore the outer straight free ends of the two flaps 12, 13 on the engine axis A, are disposed symmetrically transversely in the ram air flow St while being folded together locally in an acute manner. During the swivelling, the two flaps, with their outer surface ends, would have to be moved or movably guided along straight wall sections of the shrouding 8.

Figure 2:
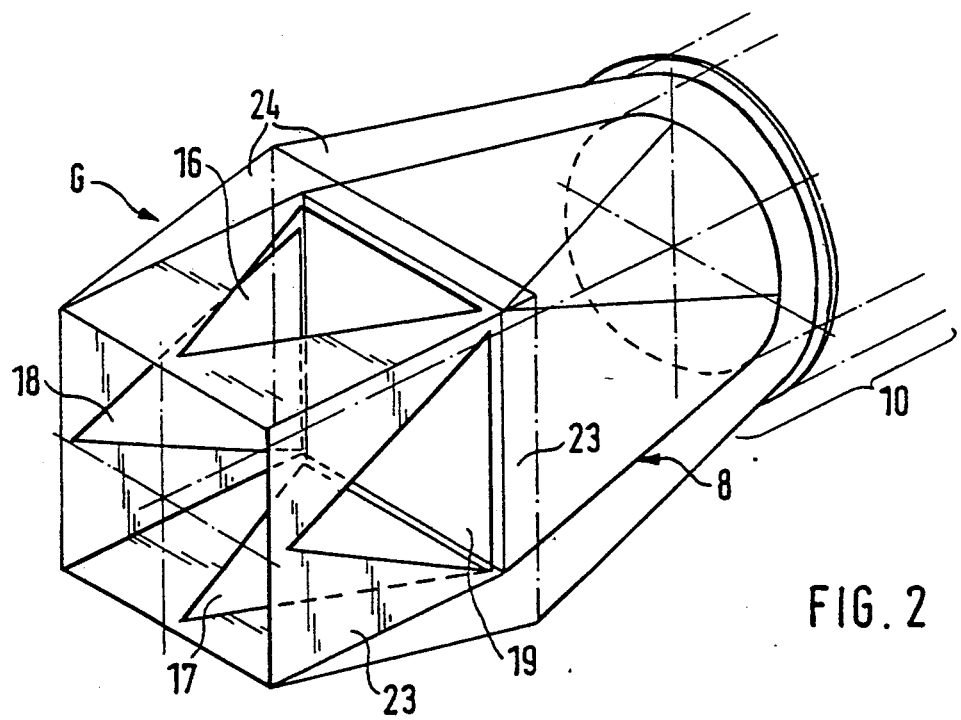
FIG. 2 is a schematic perspective view of an upstream engine section showing a wall geometry of the outer duct shrouding which is widened in a four-cornered or square manner from the front face end of the basic turbo-engine in the upstream direction, and of the shrouding enclosing the intake duct with four uniformly triangular breakthroughs contained in it, constructed according to a preferred embodiment of the invention.

FIG. 3, but particularly FIG. 1 together with FIG. 2 show clearly that the shrouding 8 and thus the air shaft 9 is widened from a cross-section which at first is circular-cylindrical with respect to the basic turbo-engine to a cross-section which, in this case, is four-cornered or square. This also applies to the outer circumferential wall 10 of the ram air duct 11.

In a constructively detailed development, according to FIG. 1 and 2, the section 23 of the shrouding 8 which forms the air shaft 9 and which, in the upstream direction, is widened, in this case in a four-cornered or square shape, may be a component of a double housing G connected to the basic turbo-engine in the flange-side connecting plane E (FIG. 1). In this case, the double housing G also has a wall section 24 which continues the outer duct wall 10 (viewed from E toward the front) and which at first is geometrically widened in space in an adaptation to section 23. This wall section 24 then tapers again uniformly in sections in the upstream direction, specifically from a plane comprising the swivel bearing of the flaps, for example, 12, 13. In this manner, among other things, an engine module is created which comprises the shut-off devices and can be removed from between the basic turbo-engine and the air inlet of the overall engine.

Figure 4:
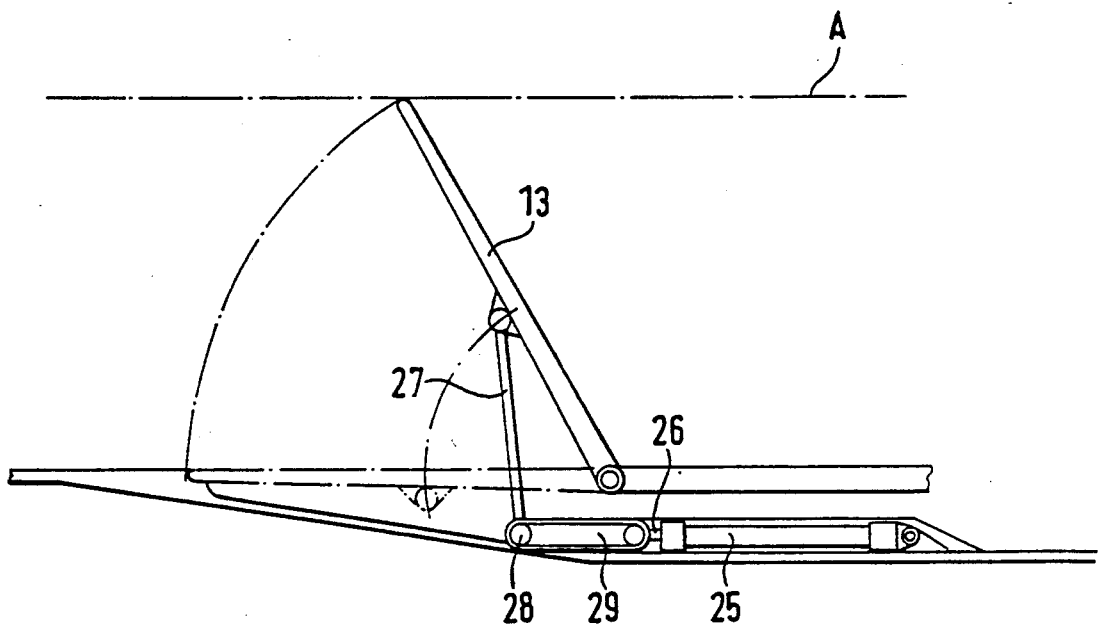
FIG. 4 is an elongated cutout of the engine which enlarges and clarifies the adjusting kinematics of a flap from FIG. 1.

According to FIG. 4, each flap, such as 13, may be swivelled by way of its own pneumatically or hydraulically actuated adjusting cylinder 25 as well as tension-compression members 26 and articulated levers 27 which are movably applied to the tension-compression members 26 as well as to the flap 13. A synchronous actuating of all adjusting cylinders is a prerequisite in this case. The mentioned articulated levers 27, at the inner ends, may on one side be applied to the tension and compression members 26, may be rotatable by means of rollers 28 in crank paths 29, and may be movable in the longitudinal direction. Expediently, an arrangement of the adjusting system (levers, adjusting cylinders) may be provided which is situated outside the ram air flow.

The invention permits the manufacturing and use of flaps which have straight walls in the axial and the circumferential direction. In a relatively simple manner, these flaps may therefore be provided with a temperature-resistant ceramic layer on the sides around which hot ram air flows during the operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A turboramjet engine having a ram air duct constructed between an outer duct wall and a housing-type shrouding of a basic turbo-engine, and having shut-off devices by means of which the ram air duct is shut off when the basic engine is switched on and the ramjet engine is switched off, while at the same time releasing intake air into the basic engine on the air supply side, wherein an upstream axial extension of the ram air duct ends in front of a compressor-side front end of a basic turbo-engine on the inlet side, wherein the shrouding forms an air shaft which in the direction of the inlet-side end of the ram air duct is widened in a polygonal manner, wherein the shrouding has breakthroughs on the inlet-side end of the ram air duct, and wherein the shut-off devices are flaps which are pivotally arranged at the breakthroughs and which, when the ramjet engine is switched on, expose the breakthroughs and in the process form a shut-off body of the air shaft which is folded together symmetrically acutely with respect to the ram air flow.

2. An engine according to claim 1, wherein the shrouding and thus the air shaft of the basic engine, from a cross-section which is at first cylindrical with respect to the basic engine, is widened to a four-cornered, particularly rectangular or square cross-section.

3. An engine according to claim 1, wherein at least two flaps are in each case arranged for pivotal movement around a transverse axis at an upstream end of the respective breakthrough and, in the shut-off position, are moved into the breakthroughs which are geometrically adapted correspondingly with an aerodynamically surface-flush shut-off effect.

4. An engine according to claim 1, wherein the flaps are pivotally arranged in a hinge-type manner at corresponding straight end surfaces of the breakthroughs.

5. An engine according to claim 1, wherein the shut-off devices are at least three triangular flaps with the same surface which, in an end position exposing the breakthroughs during the ramjet operation, form a pyramidal shut-off body of the air intake shaft which is folded together in an acute manner with respect to the ram air flow.

6. An engine according to claim 1, wherein the shrouding and thus the air intake shaft is widened to a rectangular cross-section, and the shut-off devices are four triangular flaps of the same constructional length, of which mutually opposite first flaps each have a similar surface shape but larger aerial surface area than second mutually opposite flaps with the same surface shape, all flaps together form a pyramidal shut-off body of the air shaft which is folded together in an acute manner with respect to the ram air flow when in an end position exposing the breakthroughs during the ramjet operation.

7. An engine according to claim 1, wherein a section of the shrouding of the air shaft which is widened in the upstream direction in a polygonal manner is a component of a double housing which is frontally connected to the basic turbo-engine and includes the inlet-side end of the ram air duct.

8. An engine according to claim 7, wherein, at the double housing, a wall section which continues the outer duct wall of the ram air duct, in an adaptation to the widened section of the shrouding, is geometrically widened in space and tapers uniformly in sections, in the upstream direction, from a transverse plane comprising respective swivel bearings of the flaps.

9. An engine according to claim 1, wherein each flap can be swivelled by way of its own pneumatically or hydraulically actuated adjusting cylinder as well as tension-compression members and articulated levers which are movably applied to the tension-compression members as well as to the flap.

10. An engine according to claim 9, wherein the articulated levers are arranged at their inner ends by means of rollers to be rotatable in crank paths and movable in the longitudinal direction.

11. An engine according to claim 2, wherein at least two flaps are in each case arranged for pivotal movement around a transverse axis at an upstream end of the respective breakthrough and, in the shut-off position, are moved into the breakthroughs which are geometrically adapted correspondingly with an aerodynamically surface-flush shut-off effect.

12. An engine according to claim 11, wherein the flaps are pivotally arranged in a hinge-type manner at corresponding straight end surfaces of the breakthroughs.

13. An engine according to claim 12, wherein the shut-off devices are at least three triangular flaps with the same surface which, in an end position exposing the breakthroughs during the ramjet operation, form a pyramidal shut-off body of the air intake shaft which is folded together in an acute manner with respect to the ram air flow.

14. An engine according to claim 12, wherein the shrouding and thus the air intake shaft is widened to a rectangular cross-section, and the shut-off devices are four triangular flaps of the same constructional length, of which mutually opposite first flaps each have a similar surface shape but larger aerial surface area than second mutually opposite flaps with the same surface shape, all flaps together form a pyramidal shut-off body of the air shaft which is folded together in an acute manner with respect to the ram air flow when in an end position exposing the breakthroughs during the ramjet operation.

15. An engine according to claim 6, wherein, at the double housing, a wall section which continues the outer duct wall of the ram air duct, in an adaptation to the widened section of the shrouding, is geometrically widened in space and tapers uniformly in sections, in the upstream direction, from a transverse plane comprising respective swivel bearings of the flaps.

16. An engine according to claim 12, wherein, at the double housing, a wall section which continues the outer duct wall of the ram air duct, in an adaptation to the widened section of the shrouding, is geometrically widened in space and tapers uniformly in sections, in the upstream direction, from a transverse plane comprising respective swivel bearings of the flaps.

17. An engine according to claim 12, wherein each flap can be swivelled by way of its own pneumatically or hydraulically actuated adjusting cylinder as well as tension-compression members and articulated levers which are movably applied to the tension-compression members as well as to the flap.

18. An engine according to claim 16, wherein the articulated levers are arranged at their inner ends by means of rollers to be rotatable in crank paths and movable in the longitudinal direction.

19. An engine according to claim 17, wherein the articulated levers are arranged at their inner ends by means of rollers to be rotatable in crank paths and movable in the longitudinal direction.

20. An engine according to claim 18, wherein each flap can be swivelled by way of its own pneumatically or hydraulically actuated adjusting cylinder as well as tension-compression members and articulated levers which are movably applied to the tension-compression members as well as to the flap.

* * * * *